United States Patent [19]
Suzuki et al.

[11] Patent Number: 5,312,661
[45] Date of Patent: May 17, 1994

[54] ARTIFICIAL SOIL AND PROCESS FOR PRODUCING THE SAME

[75] Inventors: Takeji Suzuki; Hiroshi Azuma, both of Hyogo, Japan

[73] Assignee: Sekisui Kaseihin Kogyo Kabushiki Kaisha, Nara, Japan

[21] Appl. No.: 758,850

[22] Filed: Sep. 13, 1991

[51] Int. Cl.$^5$ ............................................. B32B 5/14
[52] U.S. Cl. ............................... 428/36.5; 428/308.4; 521/56; 521/60; 521/142; 521/143; 521/146
[58] Field of Search ................ 521/56, 60, 142, 143, 521/134, 139; 428/36.5, 308.4

[56] References Cited

U.S. PATENT DOCUMENTS

| | | | |
|---|---|---|---|
| 4,440,908 | 4/1984 | McClain | 525/196 |
| 4,647,543 | 3/1987 | Bartosiak et al. | 521/56 |
| 4,812,339 | 3/1989 | Shibata et al. | 428/15 |

FOREIGN PATENT DOCUMENTS 2248780  5/1975  France .
49-40321  4/1974  Japan .

OTHER PUBLICATIONS

Nakamura et al, Chemical Abstracts, No. 131490C, vol. 93, No. 13, Sep. 9, 1980, Columbus, Ohio, p. 580.

*Primary Examiner*—John Kight, III
*Assistant Examiner*—John M. Cooney
*Attorney, Agent, or Firm*—Nikaido Marmelstein Murray & Oram

[57] ABSTRACT

An artificial soil made from thermoplastic resin foamed particles is disclosed, in which a plurality of thermoplastic resin foamed particles and a plurality of fine substances are bonded to each other by heat fusion of the thermoplastic resin foamed particles to form a porous structure. The artificial soil is excellent in not only air permeability, hydrophobic properties, and draining properties but also water retention and fertilizer retention.

10 Claims, 1 Drawing Sheet

ARTIFICIAL SOIL AND PROCESS FOR PRODUCING THE SAME

FIELD OF THE INVENTION

The present invention relates to a porous artificial soil excellent in air permeability and fertilizer retention and useful as a horticultural soil, a cobblestone for flowerpots, or a soil conditioner for clayey soils. The present invention also relates to a process for producing said artificial soil.

BACKGROUND OF THE INVENTION

Molded articles made from thermoplastic resin foamed materials of, e.g., polystyrene, polyethylene, or polypropylene, such as insulating containers for fishes and fruits, cushioning materials (e.g., corner pad) for appliances, trays for foods and fruits, and cups for drinks, are used today in huge quantities, and the use is extending steadily.

Since these molded articles made from thermoplastic resin foamed materials after use are not spontaneously rotten or degraded, extensive efforts have been made to make effective use of them as a recycle thereby to prevent them from causing environmental pollution. For example, they can be burnt to utilize a generated heat energy or can be heat melted to obtain reprocessed plastics. Further, molded articles after use are ground for use as a draining cobblestones to be spread on the bottom of a flowerpot or as a soil conditioner to be incorporated into clayey soils.

A soil mixed with grinds of thermoplastic resin foamed materials, on one hand, has improved properties necessary for growth of roots, i.e., air permeability, hydrophobic properties, and heat retaining properties, but, on the other hand, is poor in water retention and fertilizer retention that are also necessary for growth of plants. Moreover, because the grinds of foamed materials are extremely lighter than general soils, they float off the soil for every rainfall or sprinkling. Further, draining cobblestones made from foamed materials are crushed beneath the soil during long-term use due to low compressive strength and reduce their volume. As a result, drainage is deteriorated, or the cobblestones are carried away from drainage holes.

In order to overcome these disadvantages, a soil conditioner comprising foamed polystyrene ground particles having adhered thereonto a sand or a powdered fertilizer, e.g., cow dung, with an organic solvent, an adhesive, etc. has been proposed as disclosed in JP-B-57-61064 (the term "JP-B" as used herein means an "examined published Japanese patent application") and JP-B-U-61-2651 (the term "JP-B-U" as used herein means an "examined published Japanese utility model application"). However, not only expensiveness of the organic solvent or adhesive but the problem of solvent recovery have been bars to putting such a soil conditioner to practical use. Further, JP-A-49-40321 (the term "JP-A" as used herein means an "unexamined published Japanese patent application") discloses a process for producing an artificial granular soil from foamed polystyrene, in which a large quantity of an inorganic powder and a large quantity of foamed polystyrene particles are mixed and stirred together with an adhesive or a pulp waste liquor as a binder, once granulating the mixture, and heating the granules to fuse the foamed particles to obtain porous particulate lumps. However, the process is not deemed efficient because granulation using a binder and heat fusion of foamed polystyrene particles must be separately carried out.

SUMMARY OF THE INVENTION

An object of the present invention is to provide an artificial soil made from thermoplastic resin foamed particles and freed of the above-described technical problems associated with the conventional artificial soils, which is excellent in not only air permeability, hydrophobic properties, and draining properties but also water retention and fertilizer retention and is therefore suitable for growth of plants.

Another object of the present invention is to provide an artificial soil which can be used as a mixture with a general soil without floating off and being separated.

A further object of the present invention is to provide an artificial soil which has sufficient compressive strength for saving itself from being crushed or broken and is therefore suitable for use as a draining cobblestone.

A still further object of the present invention is to provide a process for producing an artificial soil efficiently, at low cost and in quantity by heat fusing thermoplastic resin foamed particles without using a solvent or an adhesive as a binder.

A yet further object of the present invention is to provide a method for effectively reusing used molded articles made from thermoplastic resin foamed materials, which are nowadays produced in large quantities, as a component of an artificial soil.

The present invention relates to an artificial soil comprising porous granules in which a plurality of thermoplastic resin foamed particles and a plurality of fine substances are bonded to each other by heat fusion of the thermoplastic resin foamed particles.

The present invention further relates to a process for producing an artificial soil in the form of porous granules, which comprises mixing a number of thermoplastic resin foamed particles and a number of fine substances with stirring while heating, to bond the particles and substances to each other by heat fusion and heat shrinkage of the thermoplastic resin foamed particles.

DETAILED DESCRIPTION OF THE INVENTION

Figure 1:
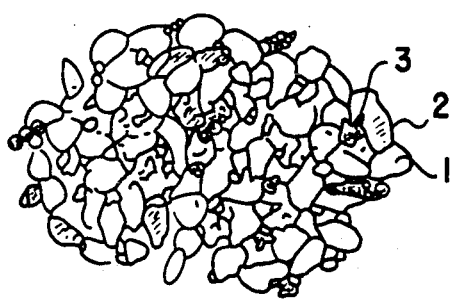
FIG. 1 is an enlarged schematic view of an artificial soil according to the present invention.

Thermoplastic resins which can be used for the foamed particles in the present invention include polystyrene resins and polyolefin resins, e.g., polyethylene and polypropylene. Foamed particles of these thermoplastic resins are softened and melted from the surface thereof on heating and are fused not only among each other but to other finely divided substances. The foamed particles also undergo heat shrinkage on heat fusion. The foamed particles include both open-cell foams and closed-cell foams.

As the foamed particles of polystyrene resins, not only those obtained by grinding bead molded articles such as packaging containers having a rate of expansion of from 20 to 70, produced by foaming and integrating expandable polystyrene beads in a mold but those obtained by grinding foamed extrusion-molded sheets such as trays for fruits having a rate of expansion of from 5 to 15 can be used. Foamed particles of polyolefin resins primarily include polyethylene foams. Since the viscosity of polyethylene is generally too low, it is preferable to use extrusion-molded articles of crosslinked polyethylene produced by irradiation with radiations or by use of a crosslinking agent so as to achieve a high rate of expansion.

The thermoplastic resin foamed particles may be spheres, strings, chips, etc. From the standpoint of cost reduction and recycling of waste products for environmental conservation, grinds of appropriate size of used molded articles of thermoplastic resin foamed materials are preferably used.

The fine substance which is mixed with the foamed particles includes organic or inorganic substances which do not decompose by heating. Specific examples of such organic or inorganic substances are natural soils, e.g., red earth, black earth, and Kanuma soil; natural sands, e.g., Kiryu sand, pumice, and Fuji sand; artificial soils, e.g., calcined and expanded mica group ores such as vermiculite and pearlite; organic substances, e.g., leaf mold, bark, wood chips, bean-curd refuse, coffee grounds, fish meal, and oil meal; charcoal powder, and ash. These substances may be used either individually or in combination thereof.

The form of the fine substance is not particularly limited and includes various forms, such as a granular form, a powder form, and a fibrous form.

While the particle size of the fine substance is appropriately selected according to a desired size of the resulting porous artificial soil, it is preferably not more than 10 mm.

The artificial soil of the present invention can be produced by bonding a plurality of fine substances and a plurality of thermoplastic resin foamed particles to each other by heat fusion of the thermoplastic resin foamed particles.

The process can be carried out by means of an apparatus in which a mixture of the thermoplastic resin foamed particles and the fine substance can be heated while stirring, e.g., a rotary kiln and a heating mixer. Such a rotary kiln or a heating mixer being employed, heating can be effected while allowing the mixture to relatively freely rotate so that the particle size of the resulting artificial soil may be controlled with relative ease.

The heating temperature depends on various conditions, such as the type of the apparatus used, the kind of thermoplastic resin foamed particle, and the desired shape, size and heat shrinkage of the artificial soil granules, but is primarily decided according to the material of the thermoplastic resin foamed particle. For example, a range of from about 130° C. to 200° C. is recommended for polystyrene foams, and a range of from about 120° C. to 160° C. for polyethylene foams. Further, the process is usually carried out at a retention time of from 3 to 10 minutes.

When the resin foamed particles and the fine substance are heat mixed in a rotary kiln or a heating mixer, the resin foamed particles are melted while undergoing heat shrinkage to thereby fusion bond the resin foamed particles and the fine substance to each other. At this time, since the volume of the foamed particles is reduced to $\frac{1}{2}$ to 1/10 by heat shrinkage, vent holes may be formed in the granulated artificial soil. Further, since the surface of the resulting artificial soil has a porous structure in an irregular uneven form, the artificial soil is rich in air permeability.

The the thermoplastic resin foamed particles may be added in a plurality of portions.

Prior to heat mixing the fine substance and the foamed particles, the fine substance is previously heated to a temperature higher than that for heat mixing, whereby not only the granulation can be completed within a shorter period of time, but extreme heat shrinkage of the foamed particles can be prevented.

A mixing ratio of the resin particles and the fine substance is so selected that the fine substance may be completely covered with the molten resin and may not exhibit its characteristics any more.

The particle size of the resulting artificial soil is subject to variation depending on the end use but is usually from about 3 mm to 50 mm. Further for example, where the artificial soil is used as a mixture with other useful soil, a suitable particle size ranges from about 5 mm to 10 mm, with required properties such as air permeability being taken into consideration. For use as a draining cobblestone, a suitable particle size is from about 10 mm to 30 mm.

The rate of expansion after heat shrinkage has influences on specific gravity, hydrophobic properties, and heat insulating properties as well as strength. Hence, the rate of expansion after heat shrinkage should be appropriately selected taking these characteristics into consideration. A recommended rate of expansion after heat shrinkage usually ranges from 3 to 20. This artificial soil is preferably used at a bulk density in the range of from 0.3 to 1.0 g/cm$^3$.

Having the above-mentioned structure, the artificial soil according to the present invention has a porous structure and exhibits air permeability, water retention, and fertilizer retention. Therefore, the artificial soil of the invention, when mixed with other useful soil, provides the most excellent artificial soil exhibiting properties essential for growth of plants, i.e., air permeability, heat insulating properties, water retention, and fertilizer retention. In this use, since the artificial soil of the invention is usually used at a bulk density of from 0.3 to 1.0 g/cm$^3$ and has a higher specific gravity than non-shrank resin foam, there is no such a fear that the artificial soil particles are separated from the other soil with which they are mixed. Further, the artificial soil of the invention has sufficient strength because the strength of the partitioning walls among cells is enhanced by heat shrinkage and therefore withstands long-term use as a cobblestone. Furthermore, having been sterilized by heating, the artificial soil contains no phytopathogenic bacteria or eggs of noxious insects and thus protects plants from diseases or noxious insects.

According to the process for producing an artificial soil according to the present invention, heat fusion and heat shrinkage of a plurality of thermoplastic resin foamed particles and fusion bonding between a plurality of thermoplastic resin foamed particles and a plurality of fine substances can be performed simultaneously, thereby achieving high production efficiency at low cost.

The present invention is now illustrated in greater detail with reference to Examples, but it should be understood that the present invention is not deemed to be limited thereto. All the parts are by volume unless otherwise indicated.

EXAMPLE 1

In a heating mixer equipped with three stirring blades were charged 3,000 parts of grinds (particle size: ca. 13 mm) of a used fish box made of a bead molded article of polystyrene foams (rate of expansion: 40 to 50), 1,000 pats of a Kanuma soil (particle size: 2 mm or less), and 10 parts of a charcoal powder (particle size: 1 mm or less), and the mixture was heated to 160° C. while stirring at a speed of 40 rpm for 10 minutes to cause heat shrinkage. There was thus obtained an artificial soil having a particle size of smaller than 8 mm, a rate of expansion of 15, and a bulk density of 0.8 g/cm$^3$, in which some of the grinds were bonded to each other, and the Kanuma soil and charcoal were dispersed therein and adhered therearound.

A hundred parts of the thus obtained artificial soil was mixed with 30 parts of pearlite as an artificial useful soil and 70 parts of a bark fertilizer to prepare a compouned soil to be used for the plant growth test as described below.

EXAMPLE 2

In a rotary kiln were charged 2,000 parts of grinds (particle size: ca. 13 mm) of a bead molded article of polystyrene foams (rate of expansion: 40 to 50) and 100 parts of a bark fertilizer (particle size: 10 mm or less), and the mixture was heat mleted to 180° C. while stirring at a speed of 20 rpm for 10 minutes to cause heat shrinkage. There was thus obtained an artificial soil having a particle size of smaller than 10 mm, a rate of expansion of 5, and a bulk density of 0.4 g/cm$^3$, in which the bark fertilizer was dispersed and fused on the surface thereof, a number of the grinds were fused to each other in a porous state, and wood fibers of the bark fertilizer were incorporated.

Seventy parts of the thus obtained artificial soil was mixed with 70 parts of pearlite, 45 parts of a mountain sand as an artificial useful soil, and 5 parts of a chemical fertilizer to obtain a compunded soil.

Marigold was planted in a pot using each of the compounded soils obtained in Examples 1 and 2 and, for comparison, a commercially available soil for flowering plants (a mixture of 70% of a mountain soil and 30% of a bark fertilizer). As a result, the plants grown on the artificial soil of the present invention came into bloom about 10 to 14 days earlier than that on the comparative soil and had blossoms 2 to 3 times as much as the latter.

Further, the marigold grown on the artificial soil of the present invention was observed to spread its roots widely into the soil throughout the pot, whereas that on the comparative soil had an outstanding axial root vertically extending from the stem with the total number of roots being only about a half that of the former marigold.

EXAMPLE 3

In a heating mixer equipped with three stirring blades were charged 4,000 parts of grinds (particle size: ca. 13 mm) of a used cushioning material made of a bead molded article of polystyrene foams (rate of expansion: 50), 100 pats of a Kanuma soil (particle size: 2 mm), and 10 parts of a charcoal powder (particle size: 1 mm or less), and the mixture was heat melted to 180° C. while stirring at a speed of 25 rpm for 10 minutes to cause heat shrinkage. There was thus obtained a porous artificial soil having a particle size of about 30 mm, a rate of expansion of 10, and a bulk density of 0.6 g/cm$^3$, in which a number of the grinds were fusion bonded to the Kanuma soil and charcoal. This is rich in draining properties and can be used as a draining cobblestone.

EXAMPLE 4

Sixty parts of perlite (density: 0.13 to 0.15 g/cm$^3$, particle size: 1 mm or less) and 40 parts of a mountain sand (particle size: 2 mm or less) were previously heated to 200° C. and then charged in a heating mixer equipped with three stirring blades. On the other hands, 2,200 parts of grinds (particle size: about 13 mm) of a molded artilce of polystyrene foams (rate of expansion: 50) were divided into three portions and then charged in the foregoing heating mixer. The mixture was granulated at 40 rpm for 5 minutes while keeping the heating mixer at 200° C.

There was thus obtained an artificial soil having a particle size of 10 mm and a bulk density of 0.3 g/cm$^3$, as illustrated in FIG. 1 in which grind 1 was heat shrunk at a rate of expansion of about 5 and fused to perlite 2 and mountain sand 3 to each other.

To a compounded soil of 70 parts of this artificial soil and 30 parts of a bark fertilizer was added a fertilizer from time to time, whereby the growth test of a bluebottle was carried out under the eaves in the winter season.

As a result, a seedling which had had a height of 90 mm at the end of November grew at a height of 300 mm and had 9 buds in February of the next year. Further, the test plant grew at a height of 720 mm and had 8 blossoms having a diameter of 50 mm and 65 buds at the beginning of April.

On the other hand, the same test was carried out using a commercially available soil for flowering plants. As a result, a seedling which had had the same height of 90 mm at the end of November grew at a height of 280 mm and had 8 buds in February of the next year. Further, the test plant grew at a height of 650 mm and had 6 blossoms having a diameter of 35 mm and 56 buds at the beginning of April. In case of this soil, a half or more of the flower buds turned downward due to the low temperature of February and was not restored until the middle of March.

In case of the compounded soil containig the artificial soil according to the present invention, no obstacle due to the low temperature was observed.

While the invention has been described in detail and with reference to specific examples thereof, it will be apparent to one skilled in the art that various changes and modifications can be made therein without departing from the spirit and scope thereof.

What is claimed is:

1. An artifical soil which is suitable for growth of plants therein comprising porous granules consisting essentially of:
    a plurality of thermoplastic resin foamed particles "selected from the group consisting of polystyrene and polyolefin foamed particles"; and
    a plurality of fine substance particles wherein the fine substance is selected from the group consisting of natural soils, natural sands, artificial soils, organic substances derived from living matter, charcoal powder, and ash;
    which granules are irregularly-shaped agglomerates in which individual particles are bonded to each other solely by heat fusion of the thermoplastic resin foamed particles wherein said thermoplastic resin foamed particles have a rate of expansion of from 3 to 20, which bonding occurs without the use of solvent or an adhesive as a binder, and which granules have the property of excellent water retention have a greater specific gravity than the starting resin foam particles.

2. A process for producing an artificial soil in the form of porous graules, which process consists essentially of mixing a plurality of thermoplastic resin foamed particles "selected from the group consisting of polystyrene and polyolefin foamed particles" and a plurality of particles of fine substances selected from the group consisting of natural soils, natural sands, artificial soils, organic substances derived from living matter, charcoal powder, and ash;

with stirring while heating to bond said plurality of thermoplastic resin foamed particles and said plurality of fine substance particles to each other in irregularly-shaped agglomerates by heat fusion of the thermoplastic resin foamed particles, wherein said thermoplastic resin foamed particles have a rate of expansion of from 3 to 20.

3. An artificial soil as claim in claim 1, wherein said thermoplastic resin foamed particles are grinds, strings, or spheres.

4. An artificial soil as claimed in claim 1, wherein said fine substances particles are organic substances derived from living matter selected from the group consisting of leaf mold, bark, wood chips, bean-cured refuse, coffee grounds, fish meal, and oil meal.

5. An artificial soil as claimed in claim 1, wherein said find substance particles are in a granular, powder, or fibrous form.

6. An artificial soil as claimed in claim 1, having a granule size of from 3 to 50 mm.

7. An artificial soil as claimed in claim 1, having a bulk density of from 0.03 to 1.0 g/cm$^3$.

8. A process as claimed in claim 2, wherein said fine substance particles are previously heated.

9. A process as claimed in claim 2, wherein said thermoplastic resin foamed particles are mixed in a plurality of portions.

10. A combination of the artificial soil of claim 1, and a living plant growing therein.

* * * * *